United States Patent [19]

Champoux et al.

[11] 4,202,242
[45] May 13, 1980

[54] WEDGE HEAD PIN FASTENER

[75] Inventors: Louis A. Champoux, Seattle; Joseph G. Falcioni, Tacoma, both of Wash.; Morton Mendels, Torrance, Calif.

[73] Assignee: The Boeing Company, Seattle, Wash.

[21] Appl. No.: 771,318

[22] Filed: Feb. 23, 1977

Related U.S. Application Data

[63] Continuation of Ser. No. 615,205, Apr. 10, 1975, abandoned, and a continuation of Ser. No. 400,334, Sep. 24, 1973, abandoned.

[51] Int. Cl.$^2$ .................................................. F16B 35/06
[52] U.S. Cl. .................................................. 85/7; 85/9 R
[58] Field of Search .................... 403/404; 52/617; 285/211, 212; 85/9 R, 5 R, 7, 43, 37

[56] References Cited

U.S. PATENT DOCUMENTS

| | | | |
|---|---|---|---|
| 2,028,528 | 1/1936 | Sipe | 85/21 |
| 2,833,325 | 5/1958 | Laisy | 85/9 R X |
| 2,972,274 | 2/1961 | LaBombard et al. | 85/5 R X |
| 2,982,166 | 5/1961 | Hobbs | 85/9 R X |
| 3,034,611 | 5/1962 | Zenic | 151/21 B X |
| 3,295,404 | 1/1967 | Baker | 85/7 |
| 3,396,996 | 8/1968 | Raptis | 85/1 R X |
| 3,512,446 | 5/1970 | Sekhon | 85/9 |
| 3,560,124 | 2/1971 | Bergere | 85/7 |
| 3,748,948 | 7/1973 | Schmitt | 85/1 R |
| 3,792,933 | 2/1974 | Stencil | 85/7 X |
| 3,849,964 | 11/1974 | Briles | 85/1 R X |

FOREIGN PATENT DOCUMENTS

| | | | |
|---|---|---|---|
| 28425 | of 1905 | United Kingdom | 85/37 |
| 318736 | 9/1929 | United Kingdom | 85/37 |
| 1112810 | 5/1968 | United Kingdom | 85/9 R |

OTHER PUBLICATIONS

*Handbook of Fastening and Joining of Metal Parts*, Laughner and Hargan, "Screws, Bolts and Nuts", 4/20/56, p. 150.

*Primary Examiner*—Rodney H. Bonck
*Attorney, Agent, or Firm*—Christensen, O'Connor, Johnson & Kindness

[57] ABSTRACT

A pin fastening device having a double tapered head, the angle of one taper being on the order of 80 degrees, or sufficient to withstand severe longitudinal forces, and the angle of the other taper being on the order of 10 degrees, so as to provide a substantial interference fit between the pin and the work members. This double tapered head may be effectively utilized with a wide variety of pin fastener attachment end styles. Furthermore, an attachment end of a pin fastener is disclosed which includes a novel configuration of annular rings, which rings have a thread angle of 60 degrees, and relatively small radii of curvature at their trough and peak. By having such a set of annular rings, one portion of the pin may be longitudinally extended sufficiently to give the pin large shear force resistance, while sufficient total ring surface is retained to withstand large tension forces. A single pin may thus have both a high shear and tension resisting capacity.

13 Claims, 4 Drawing Figures

WEDGE HEAD PIN FASTENER

This is a continuation of application Ser. No. 615,205, filed Apr. 10, 1975, a continuation of Ser. No. 400,334, filed Sept. 24, 1973, both now abandoned.

BACKGROUND OF THE INVENTION

The present invention relates generally to the art of pin fasteners.

Pin fasteners today have a wide variety of applications, but are extensively used in the aircraft industry, where rather severe strain-resisting capabilities are currently required. Furthermore, as aircraft design becomes more sophisticated, it is evident that fastening devices will be required to perform multiple functions. For instance, fasteners are being utilized to insure fuel tight fits for airplane fuel containers, as well as providing a tension or shear resistant connection between two members which are to be joined in some specified fashion.

Currently, to provide the required fuel and corrosion protection, high strain, flush-headed fasteners having a single, 100-degree included angled head are used in combination with a rubber-based sealant. The sealant provides the fuel seal and corrosion protection for the countersunk fasteners. However, this fastening combination has several disadvantages, including increased labor costs and added weight.

Although the single tapered, 100-degree pin fastener head may in some cases be designed to provide an inherent fuel seal, underhead corrosion still remains a significant problem, because there is not an adequate interference fit between the pin head and the walls of the opening in the member material. Additionally, fatigue failures typically occur in the vicinity of the countersink, thus severely shortening the useful life of the airplane or member combination fastened by the pin.

With respect to the attachment end of prior art pin fasteners, the annular rings currently provided are widely separated, having a ring angle of approximately 45 degrees, and rather large radii of curvature both at the trough of the thread, and at the head of the rings. To allow sufficient room for an appropriate number of the annular rings to be placed on a pin for tension strength, while maintaining the pin's overall weight at a minimum, the length of the shank portion of the bolt is decreased, thus severely reducing the shear strength of the pin-pin collar combination. The prior art has thus been forced to utilize one pin configuration for shear strength, and another configuration for tension strength.

The present invention, however, significantly reduces these problems, insofar as it is a double tapered wedge head bolt, having the capability of providing an adequate fuel seal and corrosion-free fastening without the use of sealants, as well as having the capability of withstanding both large shear and tension forces with minimum weight.

In accordance with the above, it is a general object of the present invention to provide a pin fastener which overcomes the disadvantages of the prior art.

It is another object of the present invention to provide a pin fastener which is capable of a controlled interference fit and which has a high resistance to tension forces.

It is a further object of the present invention to provide a pin fastener which is inherently capable of providing a fuel seal without the use of additional sealants.

It is a still further object of the present invention to provide a pin fastener having a controllable interference fit.

It is a further object of the present invention to provide a pin fastener having sufficient head interference to resist underhead corrosion.

It is a still further object of the present invention to provide a combination of work members and pin fastener such that fatigue life of the pin is increased.

It is yet another object of the present invention to provide a pin fastener which is capable of withstanding both high shear and high tension stresses.

Other and further objects, features and advantages of the invention will become apparent as the description proceeds.

SUMMARY OF THE INVENTION

In accordance with a preferred embodiment, the present invention includes a fastening pin, comprised generally of a number of portions, including a head portion having first and second circumferential tapered sections in the axial dimension of the head. Adjacent the head portion is a shank portion, and adjacent the shank portion is a circumferentially grooved securing portion. When the pin is pulled tight in use, the head engages one of the work members, the shank mates closely with the aligned openings in the work members, and a collar is swaged onto the rings of the securing portion to fasten and hold the subject work members tightly together. A breakneck portion and a gripping portion are also provided sequentially axially adjacent the securing portion, so that the pin may be maintained in tension while swaging of the collar occurs. The breakneck portion allows the gripping portion to be easily removed from the remainder of the pin after swaging is completed. More specifically, in another aspect of the invention, the securing portion includes a configuration of annular rings having a relatively small radius of curvature for trough and peak, and a ring angle on the order of 60 degrees.

DESCRIPTION OF THE DRAWINGS

A more thorough understanding of the invention may be obtained by a study of the following detailed description taken in conjunction with the accompanying drawings in which.

DESCRIPTION OF THE PREFERRED EMBODIMENT

Figure 2:
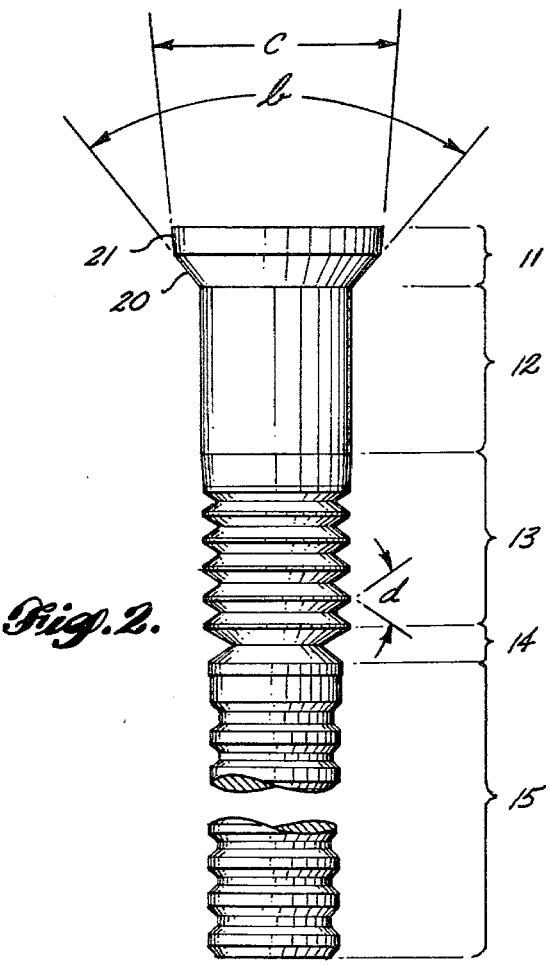
FIG. 2 is an elevation view of a pin fastener of the present invention.

Referring to FIG. 2, a pin fastener embodying the principles of the present invention is shown. A pin fastener is generally divided into four sections, and may be of varying length and diameter, depending on the size of the members which are to be fastened together. Although very prevalent in the aircraft industry, pin fasteners of this general type can be utilized as well in many other technologies. Furthermore, the pin fastener shown, although typically made from either steel or aluminum, can be made from a number of other substances, the particular material depending on factors such as cost, fabrication time, and the particular environment in which the fastener is to be used, as well as the functions which it must perform.

The general configuration of a pin fastener used in the aircraft industry includes five principal portions, denoted by numerals 11–15 in FIG. 2. The first portion of the pin fastener is the head 11, which is typically provided with a taper, and in the present invention with a double taper, so as to mate with a countersink surface in the upper work member. The portion 12 adjacent the head 11 is the shank of the pin, and is typically cylindrical. The shank portion provides the shear strength of the pin. A third portion 13, adjacent the shank portion is the attachment or securing portion of the pin, which protrudes through the opening in the work members, and to which a collar is swaged, a technique of attaching a collar to a pin which is well-known to persons skilled in the art. After proper swaging of the collar onto the securing portion, significant structural rigidity of the combination consisting of fastener-work members-collar results. The number of rings in the securing portion determines the tension strength of the pin, as well as the force necessary to pull the pin out of the work members, known as pullout force. The larger the number of rings, the greater the tension stress resistance of the pin. For a tension-type pin, five such rings are typically provided, while a shear-type pin has typically only two rings, for attachment purposes only.

Figure 4:
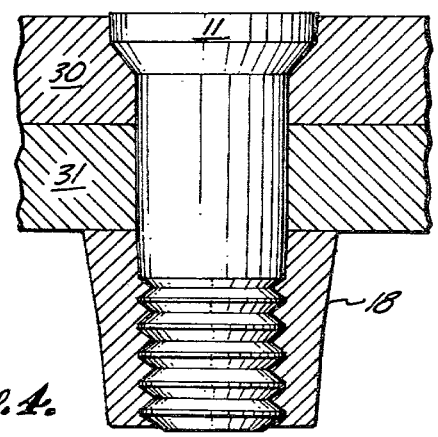
FIG. 4 is a cross-section view showing a completed fastening of two work members using the pin fastener of the present invention.

The last portion of the pin fastener is the pintail or gripping portion 15, which in use is gripped by a special swaging tool such that the pin and the work members may be pulled firmly together while collar swaging occurs. After the collar is in place, the gripping portion 15 is broken off at the breakneck 14, and the fastening operation is completed. A completed combination is shown in FIG. 4. The work members 30 and 31 are now held together firmly by means of the countersunk head 11, and the swaged collar 18.

Figure 1:
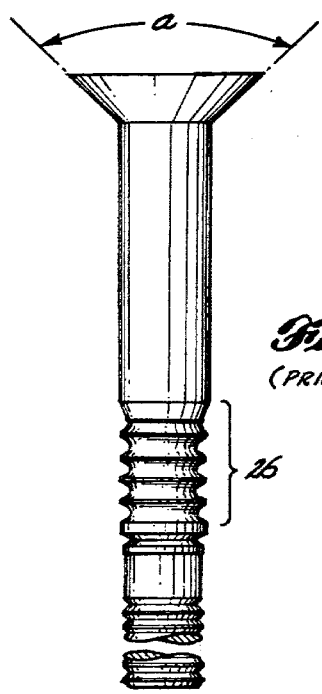
FIG. 1 is an elevation view of a prior art pin fastener.

In prior art pin fasteners such as shown in FIG. 1, there is only one tapered portion in the head, the taper angle a (being the included angle as shown in FIG. 1) typically being between 70 degrees and 100 degrees. This tapered portion mates with the countersunk surface of the upper work member and provides resistance against the head pulling through the opening when the combination is pulled tight.

This single taper of prior art fasteners is similar to the first taper 20 axially adjacent the shank portion 12 of the pin fastener of the present invention shown in FIG. 2. The first taper 20 preferably has an angle b of 82 degrees ±0.5 degrees in the present invention but as practical matter may vary substantially for example, from about 70 degrees to about 100 degrees depending on application. A second taper 21, having an angle c of 10 degrees ±0.5 degrees is provided axially adjacent the first taper 20, and extends to the top of the head 11. The angles described are the taper or included angles as shown in the drawings. The significance of the double tapered head is explained in the following paragraphs.

It has been found that a single taper of 82–100 degrees will not provide a good interference fit between the head and a countersunk work member. An interference fit exists when the original outside dimension of the pin is larger than the original diameter of the opening in the work member into which the pin is to be fitted. Thus, when the head of the pin is forced into place in the opening, the opening is forcibly wedged outwardly, resulting in an extremely tight, "interference" fit between the pin head and the work member.

Such an interference fit is not possible with a large angle taper such as 80 degrees, as this angle does not permit the wedging effect. It has been found by the applicants that this effect only occurs when the taper angle is on the order of 30 degrees or less. Furthermore, taper angles between 20 and 30 degrees have been found to have certain disadvantages in that there is a resulting variance in the interference fit in the axial direction of the taper. This lack of positive control over interference decreases as the taper angle decreases. It has been found by the applicants that a taper angle on the order of 10 degrees provides a high quality interference fit between the head of the pin and the work member. This interference fit provides inherent sealing between the work members and the pin, as well as corrosion resistance under the pin head.

However, this small angle taper, which is desirable for interference fit purposes, does not provide significant resistance to the pin being pulled through the opening in the work members. Thus, a second taper is provided to accomplish a high pullout resistance. The first taper 20 is located adjacent the shank portion 12 of the bolt to provide the necessary high pin pullout resistance.

Thus, by the use of a double taper configuration, one taper providing pullout resistance, and the other taper providing an interference fit, a pin fastener head is provided which improves corrosion protection for both head and countersink, provides a fuel sealing capability without the necessity of additional sealants, and provides an increased fatigue life for the combination of pin and work members.

The interference fit for the head of the present invention is between 0.008 and 0.005 inches; i.e., the diameter of the head of the pin is between 0.005 and 0.008 inches larger than the original inside diameter of the opening in the work member. It has been found that a sufficient interference fit for fuel-tight purposes is 0.002 inches; however, the additional interference has been found by the applicants to increase the fatigue life of the combination of pin and work member.

As noted above, given a predetermined thickness of work members, the shank length of the pin fastener of the prior art is determined by the kind of stress to which the pin is to be primarily subjected. If the pin combination is to undergo shear stress primarily, a long shank is provided, with a minimum securing portion length; i.e., the securing portion length is sufficient for two annular rings. If the pin combination is to undergo tension stress primarily, the shank portion is shortened, and the securing portion is slightly lengthened, so as to give space for a sufficient number of annular rings in the securing portion to resist the large tension stresses.

The configuration of the individual annular rings 26 at the securing end of the pin of the prior art is shown in FIG. 1. Because weight is often a critical parameter and must be minimized, the use of such a general ring configuration permits only two such annular rings at the securing end of a pin that is to be subjected to high shear stress. This number of annular rings provides only a minimum pin capacity to withstand tension stress, and thus such a pin can only be used for shear stress applications.

If a tension resisting pin is desired, more annular rings are required, and thus, as noted above, the shank portion is shortened slightly, and the securing portion lengthened to provide room for the rings. Five annular rings are typically provided in a tension resisting pin, such that when the collar is placed over the securing portion of the pin and swaged, sufficient contact results between the collar and the annular rings to provide a combination pin-collar with high tension stress resistance. However, as noted above, because the length of the shank portion is necessarily reduced because of weight considerations, the shear stress capacity of this type of pin is substantially impaired. Thus, this pin is used when the stress on the pin and the work members is to be primarily tensional in nature. Thus, the ring configuration of prior art requires that two pins be manufactured, one for shear force applications and one for tension force applications.

The present invention, however, utilizes a novel configuration of annular rings at the securing portion of the pin fastener such that one pin is both shear and tension force resistant. By changing the thread angle d to substantially 60 degrees, and decreasing substantially the radii of curvature of the trough and peak of the annular rings, (compare FIG. 2 with FIG. 1), a significantly greater number of annular rings may be formed in a securing portion of given axial length. Furthermore, by so changing the configuration of the rings, a greater inherent tension stress resisting capacity for each ring is achieved. The shank portion may thus be kept at a length equal to that of the prior art shear pin, while sufficient annular rings may be provided in a minimum length securing portion to provide large tension stress resistance. Thus, the overall length of the pin of the present invention is no longer than the length of present shear pins, but because of the novel ring configuration, a sufficient number of rings may be located in the securing portion to give the tension stress capacity of longer prior art tension pins. The preferred embodiment shown in FIG. 2 has five rings in the securing portion 13. Thus, by utilizing the configuration of annular rings of the present invention, a pin fastener is provided whereby a single embodiment provides high resistance to both shear and tension forces, and has a minimum total length, and hence, weight.

Figure 3:
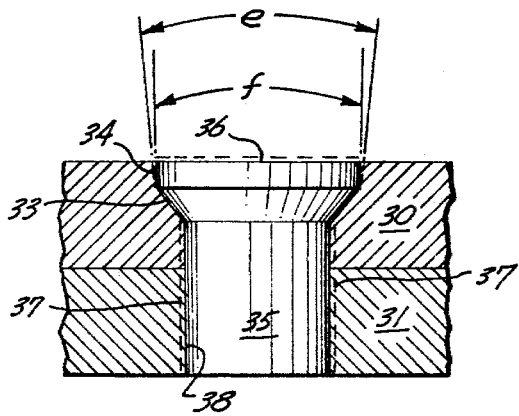
FIG. 3 is a cross-section view showing the positioning of a pin fastener of the present invention into a work member.

Referring to FIG. 3, the physical relationship between the pin and the work member countersink and opening in use is shown. The work member comprises two metal sheets 30 and 31, which are to be tightly held together by the combination of the pin and collar. The head portion is double tapered as explained above, the first taper 33 axially adjacent the shank 35 having an angle of approximately 82 degrees, and the second taper 34 adjacent the top surface 36 of the head having an angle e of approximately 10 degrees. It has been found by the applicants that a countersink angle in work member 30 equal to the head taper angle of the pin will frequently result in material fatigue failures at the countersink site. These failures have been found to be due to fatigue from tension stresses produced at the countersink of the work member.

With respect to fatigue failures in general, it is a design goal to have such failures occur ultimately at the interface between the two sheets 30 and 31. By designing all other fatigue failures out, the pin and hence the combination will ultimately fail at the interface location, and the structural effect of the opening in the work piece is thus essentially eliminated. The highest fatigue capability of the combination with respect to a given pin fastener is thus achieved.

Such a result is achieved by countersinking that portion of the work member 30 which is to mate with the 10 degrees head taper a few degrees less than 10 degrees. In the preferred embodiment this countersink angle f is on the order of 8 degrees. The reduction of the countersink angle relative to the interference taper angle e of the head largely eliminates the fatigue failure problems due to stress at the top of the countersink, and thus significantly increases the fatigue life of the fastened combination.

Referring to FIG. 3, the dotted lines 37 show the dimensions of the pin fastener before insertion into the work piece while the solid lines 38 show the original interior surfaces of the machined countersink and opening in the work members 30 and 31. When the pin is forced through the members 30 and 31, the surrounding metal in the members is pushed out by the pin, thus providing the interference fit. The use of the smaller countersink angle f relative to the head taper angle e results in a fuel tight interference fit, and also shifts the effect of any stresses present at the countersink down into the shank portion of the pin, in the proximity of the interface between the two sheets 30 and 31. This results in a longer fatigue life of the combination of work members and pin fastener, as the stresses are now concentrated in that portion of the pin best able to withstand them.

Thus, a novel pin fastener for fastening various configurations of materials securely together has been disclosed. In one aspect, it includes a double tapered head portion, the angle of the taper adjacent the top of the fastener head being a few degrees greater than the countersink angle of the work member. This results in a fuel-tight fit without sealants, as well as a reduction of corrosion under the pin head, and a significant reduction of fatigue failures in the proximity of the countersink. Another aspect includes a novel configuration of annular rings at the attachment end of the pin, allowing one pin to be utilized for both shear and tension applications, and thus providing significant advantages and cost savings over the prior art.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A wedge head pin fastener for securing together of overlapped work members having an opening extending therethrough, a portion of said opening being a countersink, said countersink having first and second countersink surfaces, said first countersink surface being positioned axially inwardly from said second countersink surface, and having a taper angle of from 70° to 100°, said second countersink surface having a taper angle of less than 20°, said pin fastener comprising:

a head having first and second tapered sections for engagement with said first and second countersink surfaces, respectively, said first tapered section having a taper angle of from 70° to 100° and being sufficiently large to substantially prevent pull-through of said pin fastener in said opening upon engagement with said first countersink surface, said second tapered section having a taper angle of less than 20° but exceeding said taper angle of said second countersink surface and being sized so that, upon forcible insertion of said pin fastener into said opening, said second countersink surface is diametrically enlarged and forms an interference fit with said second tapered section when said pin fastener is operatively positioned in said opening, whereby a structural joint is formed wherein said second countersink surface is pushed out to conform to the taper angle of said second tapered section so that effects of stresses are shifted to the interior of the structural joint; and a shank depending from said head and receivable in said opening.

2. The pin of claim 1 wherein said shank is sized to exceed the interior diameter of said opening over at least a portion of its length whereby the interior diameter of said opening is increased upon forcible insertion of said pin causing metal surrounding said opening to be pushed out in an interference fit with said shank.

3. The pin fastener of claim 1, wherein the taper angle of said second tapered section is on the order of 10°.

4. The pin fastener of claim 1, wherein the taper angle of said first tapered section is on the order of 82°.

5. The pin fastener of claim 4, wherein said shank is a right circular cylinder.

6. The pin of claim 1 wherein said interference fit with said second tapered section is of the order of 0.002 to 0.008 inches.

7. A wedge head pin fastener for securing together a plurality of overlapped work members having an opening therethrough, said opening having first and second countersink surfaces, said second countersink surface extending axially inwardly from the intersection of said opening and an outer surface of said work members and having a taper angle of less than 20°, said first countersink surface being disposed axially inwardly from said second countersink surface, said pin fastener comprising:

a head having an end face and first and second tapered sections for engagement with said first and second countersink surfaces, respectively, said first tapered section having a taper angle of from 70° to about 100° and being sufficiently large to substantially prevent pull-through of said pin fastener in said opening when engaged upon said first countersink surface, said second tapered section being axially adjacent said end face, having a taper angle of less than 20° but exceeding said taper angle of said second countersink surface, and being sized so that, upon forcible insertion of said pin fastener into said opening, said second countersink surface is diametrically enlarged and forms an interference fit with said second tapered section, whereby a structural joint is formed wherein said second countersink surface is pushed out to conform to the taper angle of said second tapered section so that effects of stresses are shifted to the interior of the structural joint, and;

a shank depending from said head, said shank having a securing portion thereon, said securing portion including a plurality of circumferential grooves and a plurality of circumferential rings formed intermediate said circumferential grooves, each said rings having an apex and each of said grooves having a base adjacent apexes and bases, being joined by substantially straight ring sides, adjacent ring sides of each of said rings forming a ring angle at their apexes of from 55° to 65°.

8. The fastening pin of claim 7, wherein said ring angle is about 60°.

9. The pin fastener of claim 7 having at least five of said rings formed on said securing portion.

10. A fastening pin for securing together a plurality of overlapped work members having an opening extending therethrough, a portion of said opening being a countersink, said countersink having first and second countersink surfaces said first countersink surface being positioned axially inwardly from said second countersink surface, and having a taper angle of approximately 82°, said second countersink section having a taper angle of approximately 8°, said fastening pin comprising:

a head having first and second tapered sections for engagement with said first and second countersink surfaces, respectively, and further having an end face, said first tapered section being adjacent said end face and having a taper angle of approximately 82°, said second tapered section being adjacent said first tapered section and having a taper angle of approximately 10°, such that an interference fit results between at least said second tapered section and said second countersink surface when said fastening pin is operatively positioned in said opening, whereby a structural joint is formed wherein said second countersink surface is pushed out to conform to said taper angle of said second tapered section so that effects of stresses are shifted to the interior of the structural joint;

a right circular cylindrical shank depending from said head, and receivable in said opening;

a securing portion adjacent said shank, said securing portion including a plurality of circumferential grooves and a plurality of circumferential rings formed intermediate said circumferential grooves, each of said rings having an apex and each of said grooves having a base, adjacent ones of said apexes and said bases being joined by substantially straight ring sides, adjacent ring sides of each of said rings forming a ring angle at the apex thereof of about 60°, such that at least four of said rings may be formed on said securing portion.

11. A wedge head pin fastener for securing together a plurality of overlapped workpieces wherein an interference fit between said pin fastener and said workpieces shifts the effect of stresses inwardly from an outer workpiece surface toward the interface between said overlapped workpieces, said overlapped workpieces having an opening extending therethrough, a portion of said opening being a countersink, said countersink having a first countersink surface positioned within said opening and having a first countersink taper angle of approximately 82°, and a second countersink surface positioned axially adjacent said first countersink surface and between said first countersink surface and one surface of said workpieces, and having a second countersink taper angle of approximately 8°, said pin fastener comprising:

a head having an end face and first and second tapered sections for engagement with said countersink, and a shank depending from said first tapered section, said second tapered section being axially adjacent said end face, said first tapered section being axially adjacent said second tapered section, said second tapered section having a substantially smaller taper angle than said first tapered section, said first tapered section adapted to engage said first countersink surface and having a taper angle of approximately 82° and being sufficiently large to substantially prevent pull-through of said pin fastener in said opening, said second tapered section having a taper angle of approximately 10°, such that an interference fit results between at least said second tapered section and said second countersink surface when said pin fastener is operatively positioned in said opening, whereby a structural joint is formed in which the workpiece material adjacent the interface between said second countersink surface and said workpiece surface is pushed out to a greater extent than the workpiece material at the intersection of said first countersink surface and said second countersink surface so that a fluid-tight, interference fit is created between said pin fastener and said workpiece.

12. The pin fastener of claim 11 wherein said taper angle of said second tapered section is slightly greater than said second countersink taper angle.

13. The combination of claim 11 wherein said interference fit extends over the length of said opening containing said shank.

* * * * *